(12) United States Patent
Carpenter

(10) Patent No.: US 11,085,730 B2
(45) Date of Patent: Aug. 10, 2021

(54) BOW STAND WITH FULLY ADJUSTABLE STABILIZING CAPABILITY

(71) Applicant: Bow Rigger LLC, Charleston, WV (US)

(72) Inventor: Troy Carpenter, Ripley, WV (US)

(*) Notice: Subject to any disclaimer, the term of this patent is extended or adjusted under 35 U.S.C. 154(b) by 177 days.

(21) Appl. No.: 15/853,726

(22) Filed: Dec. 23, 2017

(65) Prior Publication Data
US 2019/0025009 A1  Jan. 24, 2019

Related U.S. Application Data

(60) Provisional application No. 62/534,234, filed on Jul. 19, 2017.

(51) Int. Cl.
| | | |
|---|---|---|
| *F41B 5/14* | (2006.01) | |
| *A45F 3/44* | (2006.01) | |
| *A01M 31/00* | (2006.01) | |

(52) U.S. Cl.
CPC .......... *F41B 5/1453* (2013.01); *F41B 5/1426* (2013.01); *A01M 31/00* (2013.01); *A45F 3/44* (2013.01)

(58) Field of Classification Search
CPC ........ F41B 5/14; F41B 5/1426; F41B 5/1442; F41B 5/1453; F41A 23/08; F41A 23/10; A01M 31/00; A45F 3/44
USPC ...................................... 124/23.1, 86, 88, 89
See application file for complete search history.

(56) References Cited

U.S. PATENT DOCUMENTS

| | | | |
|---|---|---|---|
| 3,256,872 A | | 6/1966 | Koser |
| 3,520,506 A | * | 7/1970 | Zahuranecemeryj .. A47C 9/007 248/188 |
| 4,017,997 A | * | 4/1977 | Peterson ................. F41A 23/08 42/94 |
| 4,054,121 A | * | 10/1977 | Hoyt, Jr. ............... F41B 5/1426 124/89 |
| 4,360,179 A | | 11/1982 | Roberts |
| 4,553,522 A | * | 11/1985 | Topping ................ F41B 5/1426 124/89 |
| 5,106,044 A | | 4/1992 | Regard et al. |
| 5,205,272 A | | 4/1993 | Boyer |
| 5,405,125 A | * | 4/1995 | Gartland .............. B23Q 1/5406 269/51 |
| 5,535,731 A | * | 7/1996 | Webster ................ F41B 5/1426 124/89 |
| 5,619,981 A | * | 4/1997 | Breedlove ............. F41B 5/1426 124/86 |
| 5,630,407 A | * | 5/1997 | Gasser .................. F41B 5/1426 124/89 |

(Continued)

*Primary Examiner* — Jonathan Liu
*Assistant Examiner* — Guang H Guan
(74) *Attorney, Agent, or Firm* — Dinsmore & Shohl LLP; Monika L'Orsa Jaensson, Esq.

(57) ABSTRACT

The disclosed technology is directed to a stabilizing bow stand for use with a bow having a bow riser, wherein the stabilizing bow stand may be secured either to the bow riser or to an end of a stabilizer affixed to the bow riser. The stabilizing bow stand of the disclosed technology includes a mounting bracket having a support element and one or more legs independently and pivotally affixed at a proximal end of the leg(s) to the mounting bracket. The support element has a mounting hole to receive fastening means to facilitate mounting of the bracket to the bow or to the end of the stabilizer mounted on the bow.

2 Claims, 10 Drawing Sheets

(56) References Cited

U.S. PATENT DOCUMENTS

| | | | | |
|---|---|---|---|---|
| 5,853,000 A * | 12/1998 | Torgerson | | F41B 5/14 |
| | | | | 124/88 |
| D406,302 S * | 3/1999 | Simpson | | F41B 5/1426 |
| | | | | D22/100 |
| 6,131,556 A | 10/2000 | Villarreal | | |
| 6,205,992 B1 | 3/2001 | Meeks et al. | | |
| 6,957,648 B1 | 10/2005 | Adcock | | |
| 7,036,497 B2 | 5/2006 | Horn | | |
| 7,401,431 B2 * | 7/2008 | Pierce | | F41A 23/08 |
| | | | | 42/94 |
| 7,426,800 B2 * | 9/2008 | Pierce | | F41A 23/10 |
| | | | | 248/166 |
| 7,434,773 B1 * | 10/2008 | Minjares | | F41A 23/06 |
| | | | | 124/86 |
| 7,810,773 B2 * | 10/2010 | Chi | | F16M 11/2064 |
| | | | | 248/278.1 |
| 8,161,956 B2 * | 4/2012 | Bednar | | F41B 5/123 |
| | | | | 124/25 |
| 9,038,618 B1 * | 5/2015 | Bomar | | F41B 5/1426 |
| | | | | 124/86 |
| 9,046,317 B2 * | 6/2015 | McPherson | | F41B 5/1426 |
| D734,417 S * | 7/2015 | Wilkinson | | F41B 5/1426 |
| | | | | D22/107 |
| 9,568,270 B1 | 2/2017 | LoRocco et al. | | |
| 9,638,488 B1 | 5/2017 | Broberg et al. | | |
| 9,651,333 B1 * | 5/2017 | Princiotta | | F41A 23/12 |
| 9,803,950 B1 * | 10/2017 | Khoshnood | | F41B 5/1453 |
| 10,240,886 B1 * | 3/2019 | Huang | | F41B 5/1426 |
| 10,619,966 B2 * | 4/2020 | Ozanne | | F41B 5/0031 |
| 2013/0233292 A1 | 9/2013 | Gardner | | |
| 2013/0291846 A1 | 11/2013 | Arndt | | |
| 2015/0204479 A1 * | 7/2015 | Bryant | | F16M 11/041 |
| | | | | 348/376 |
| 2019/0025009 A1 * | 1/2019 | Carpenter | | F41B 5/1453 |
| 2019/0145729 A1 * | 5/2019 | Ozanne | | F41B 5/0052 |
| | | | | 124/89 |

* cited by examiner

BOW STAND WITH FULLY ADJUSTABLE STABILIZING CAPABILITY

BACKGROUND

The disclosed technology is directed to a stabilizing bow stand for use with a bow having a bow riser, wherein the stand may be secured either to the bow riser or to the end of a stabilizer affixed to the bow riser.

In bow hunting, bow stands are provided to hold the bow above the ground when not in use; however, these stands must be removed or collapsed when the bow is used in hunting or competition. Presently, target archers use clip-on or non-free standing stands, and bow hunters (constrained by certain hunter class competition rules) have few, if any, stand options. Further, stabilizers are frequently affixed to the front or rear of bows to remove vibration from the bow. Stabilizers are provided in a variety of weights, sizes and materials.

Some previous or existing forms of bolt-on stands use the same mounting location as the balancing/stabilizing system, forcing the archer to choose between a stand or a stabilizer, or interchange the systems between use and storage. Some archers adjust their rear stabilizer bars to an unbalanced position to facilitate leaning the bow when not in use, leaving the bow's bottom limb and cam in contact with the ground, unprotected from scratches and harmful elements. Clip-on and slip-on style stands are unhandy and cumbersome to use, and must be removed to use the bow. As a result, they are easy to lose, and can mar up expensive bow equipment. Non-free standing stands of the prior art inconveniently require some object for the bow to lean against, increasing the risk of scratching the bow.

There is a need for a bow stand that can hold the bow above the ground when not in use, but remain on the bow when the bow is used in hunting or archery competition, and that can further act as a stabilizer.

The disclosed technology is a stabilizing bow stand which attaches to the riser of a bow and/or to the end of a stabilizer. By its design and configuration, the disclosed technology micro-tunes the bow's balance in use and supports the bow off of the ground when not in use, with the bottom limb and cam of the bow held safely protected away from the ground. It can further be used as the bow's sole means of left, right and rear balancing, or it can be used in conjunction with other stabilizer to micro-tune weight distribution of the bow and its components. Damage to the bow is limited, as the disclosed technology may remain on the bow when the bow is being used for archery.

Bow hunters and Hunter Class competitors will appreciate the benefits and rewards of the system of the disclosed technology. In the Hunter Divisions of competitive archery, the equipment used must comply with certain tournament rules. Specifically, the front stabilizer bar has a maximum length specification which inhibits the use of, or makes the use of any bow stand difficult or insufficient. An embodiment of the disclosed technology is removably affixed to the front of any length stabilizer rod, and provides a free standing bow stand, with one or more legs extended downward and adjusted to become a front prop for a shorter stabilizer, and by its novel design and configuration enables the archer to strategically position weight for balance, while complying with tournament rules.

Generally, the disclosed technology consists of a bracket with multi-positionable legs, the legs supporting an adjustable-weight foot system. Various components of the disclosed technology may use an 8-32 thread size, allowing an archer to use his or her own arrow shafts to customize the legs.

General Description

The disclosed technology is directed to a stabilizing bow stand for use with a bow having a bow riser, wherein the stand may be secured either to the bow riser or to the end of a stabilizer affixed to the bow riser. The stabilizing bow stand of the disclosed technology includes a mounting bracket having a support element and one or more legs independently and pivotally affixed to the mounting bracket. In the embodiments described below, two legs are independently and pivotally affixed to the mounting bracket when the stand is secured to the bow riser, extending behind the bow, and one or two legs are used when the stand is secured to the end of a stabilizer. The support element has a mounting hole to receive fastening means to facilitate mounting of the bracket to the bow riser or to the end of a stabilizer mounted on the bow.

An adjustable-weight foot system defined by a base and a shaft are removably affixed to the distal end of the leg(s), wherein the shaft of the foot is affixed to and extends from the base, and is designed and configured to be received in a channel of the distal end of the corresponding leg. When the shaft of the foot is partially received within the channel of the distal end of the leg, the base of the foot may be maintained a distance away from the distal end of the leg, and by this design and configuration the shaft of the foot can receive and support one or more weights between the distal end of the leg and the base of the foot. In such an embodiment, if weights are only positioned on one leg, the opposing leg may be lengthened by means of partial removal of the shaft of the foot from the leg channel, by the same distance as the opposing leg accommodating the weight(s), and secured in position by means of a locking screw nut positioned on the shaft of the foot.

As hereinafter described, embodiments of the disclosed technology include a channel at the proximal end of each leg, wherein the channel is designed and configured to receive a shaft pivotally secured to the mounting bracket; in alternative embodiments, a shaft is included at the proximal end of each leg, the shaft being designed and configured to be received in a channel of the mounting bracket.

The stabilizing bow stand of the disclosed technology may be designed and configured so that the legs independently pivot about two distinct axes of the mounting bracket to allow positioning in a plurality of orientations relative to the mounting bracket. In some of these embodiments the stand includes a positioning bracket which supports each leg, through a shaft and corresponding channel arrangement. These positioning brackets may be independently pivotally affixed to opposing sides of the support element. An exemplary embodiment of such pivotal affixation, as described below, provides a pair of apertures to receive fastening means to fasten the positioning bracket to the mounting bracket, wherein one of the apertures of the positioning bracket is configured as an elongated arced slot to facilitate rotational adjustment of the leg relative to the mounting bracket.

To facilitate multi-directional pivoting, these or other positioning brackets may each be removably affixed to a segmented ring wherein the ring is sized and shaped to rotate about cylindrical ends of the support element. In this embodiment, the segmented rings have apertures at each truncated end to receive the fastening means of the positioning brackets.

Alternatively, the mounting bracket may have a pair of arms independently rotatably affixed on opposing sides of the support element by means of a pin, each arm supporting removable affixation of a positioning bracket. In this embodiment, the pin extends through a latitudinal channel of the support element and latitudinal orifices of the arms. The arms may be secured in position relative to the support element by fastening means, such as screws, secured in the latitudinal orifice of each of the arms, and received within orifices extending longitudinally in opposing ends of the pin.

In another embodiment, the arms are replaced with a frame, wherein the frame has one or two vertical segments, the vertical segment(s) having lateral channels for rotationally securing the vertical segments to the support element, and the pin traverses a latitudinal channel of the support element aligned with the lateral channels of the vertical segments. One or more legs may be removably affixed to the end(s) of the one or more vertical segments.

The disclosed technology further includes a mounting bracket for use with a stabilizing bow stand designed to mount to a bow and support one or more legs, the mounting bracket comprising a support element and a pair of shafts pivotally affixed to the support element so that each shaft rotates independently, about two distinct axes of the support element, each shaft being designed and configured to be received in a threaded channel of an arrow shaft.

DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The disclosed technology regards a stabilizing bow stand 1 for use with bows.

As shown in FIGS. 1-12, the stabilizing bow stand of the disclosed technology has a mounting bracket 200 and one or more legs 100 affixed to the mounting bracket and positionable in multiple orientations relative to the mounting bracket, wherein when mounted on a bow riser or the end of a front stabilizer, the technology supports the bow above the ground when not in use, and stabilizes and balances the bow when in use. The mounting bracket may be constructed of aluminum, plastic, steel, or any other material, or combinations thereof, suitable for supporting a bow.

Figure 1:
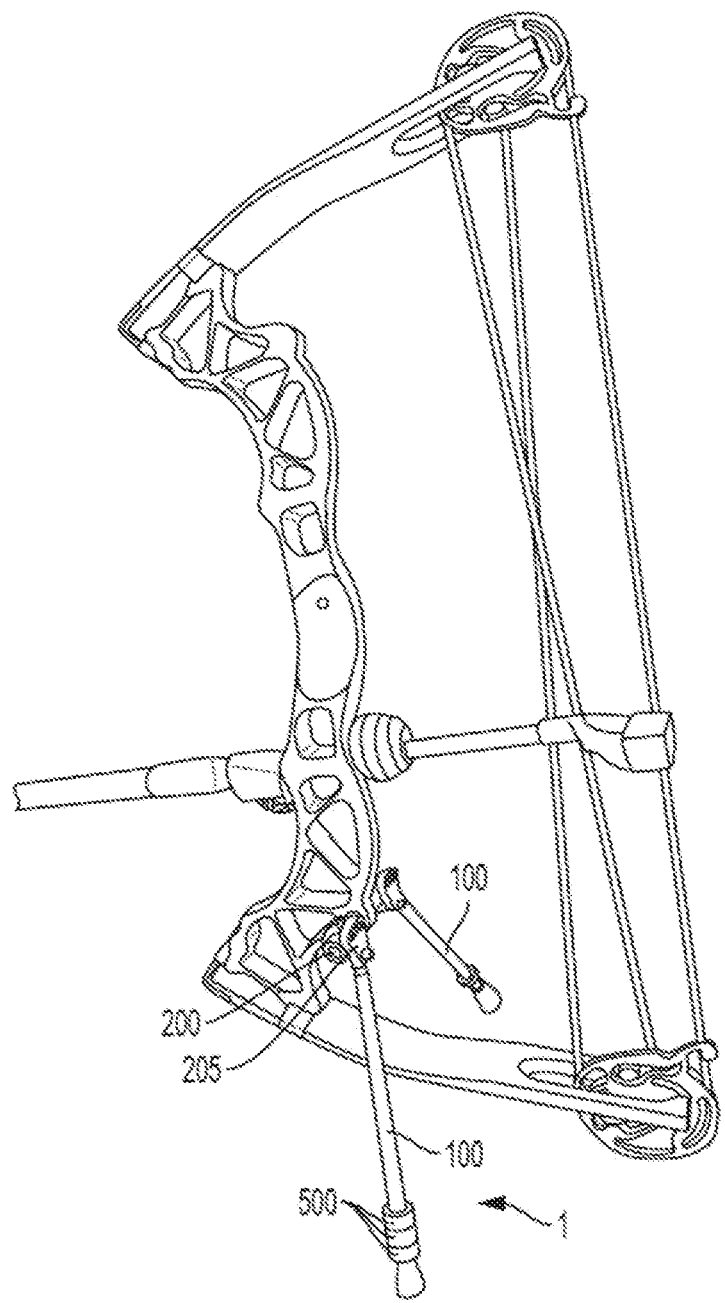
FIG. 1 is a perspective view of an embodiment of a stabilizing bow stand of the disclosed technology, installed on a bow riser.
Figure 2:
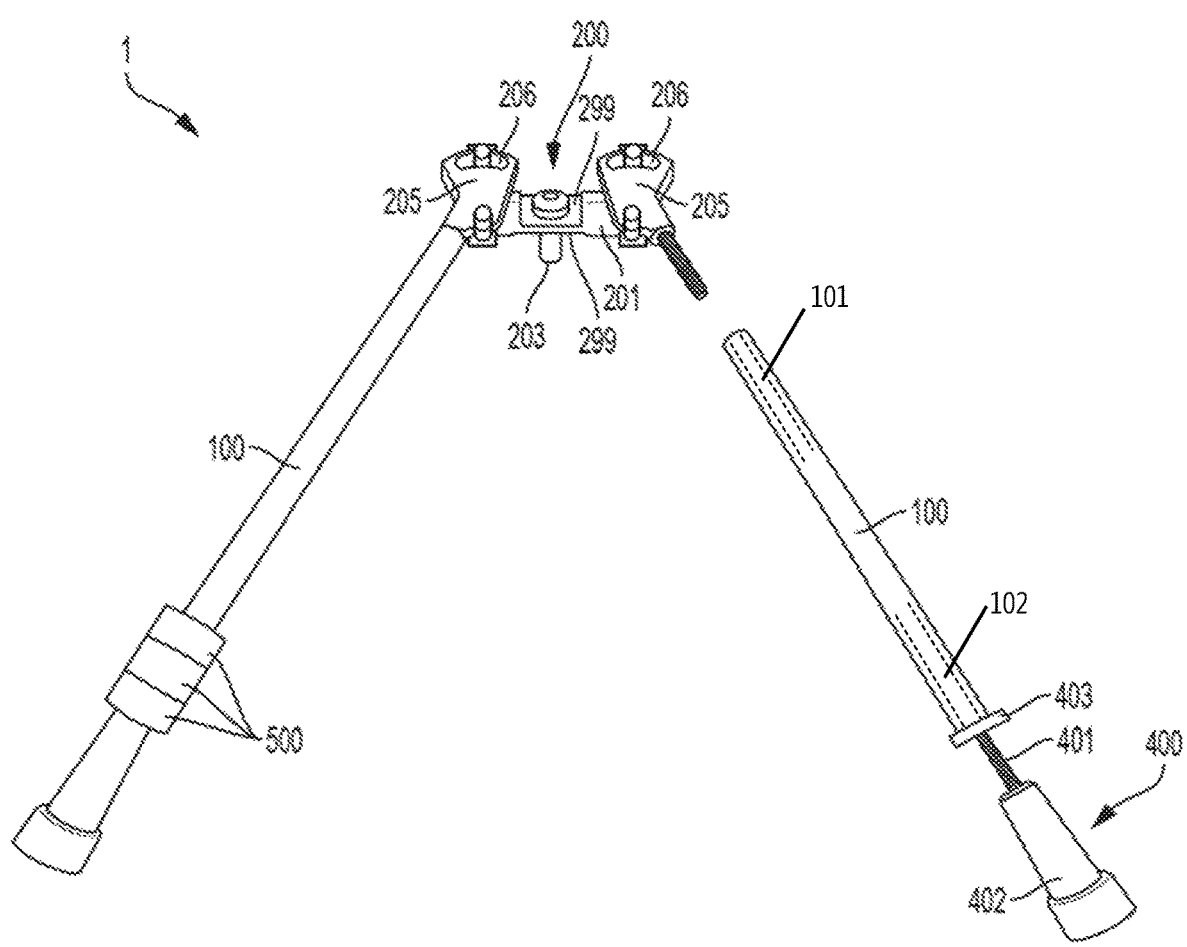
FIG. 2 is a perspective view of another embodiment of a stabilizing bow stand of the disclosed technology.
Figure 5:
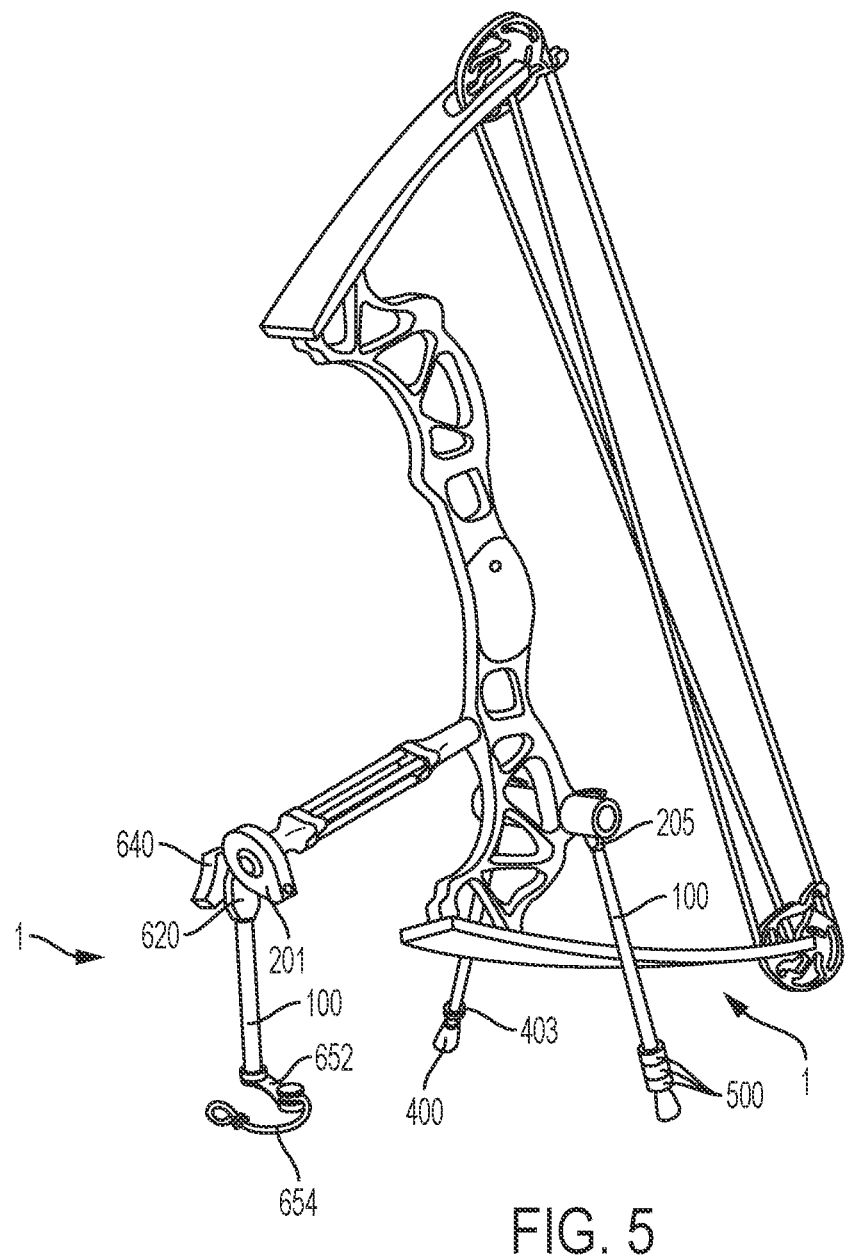
FIG. 5 is a perspective view of two embodiments of stabilizing bow stands of the disclosed technology, installed on a bow.
Figure 6:
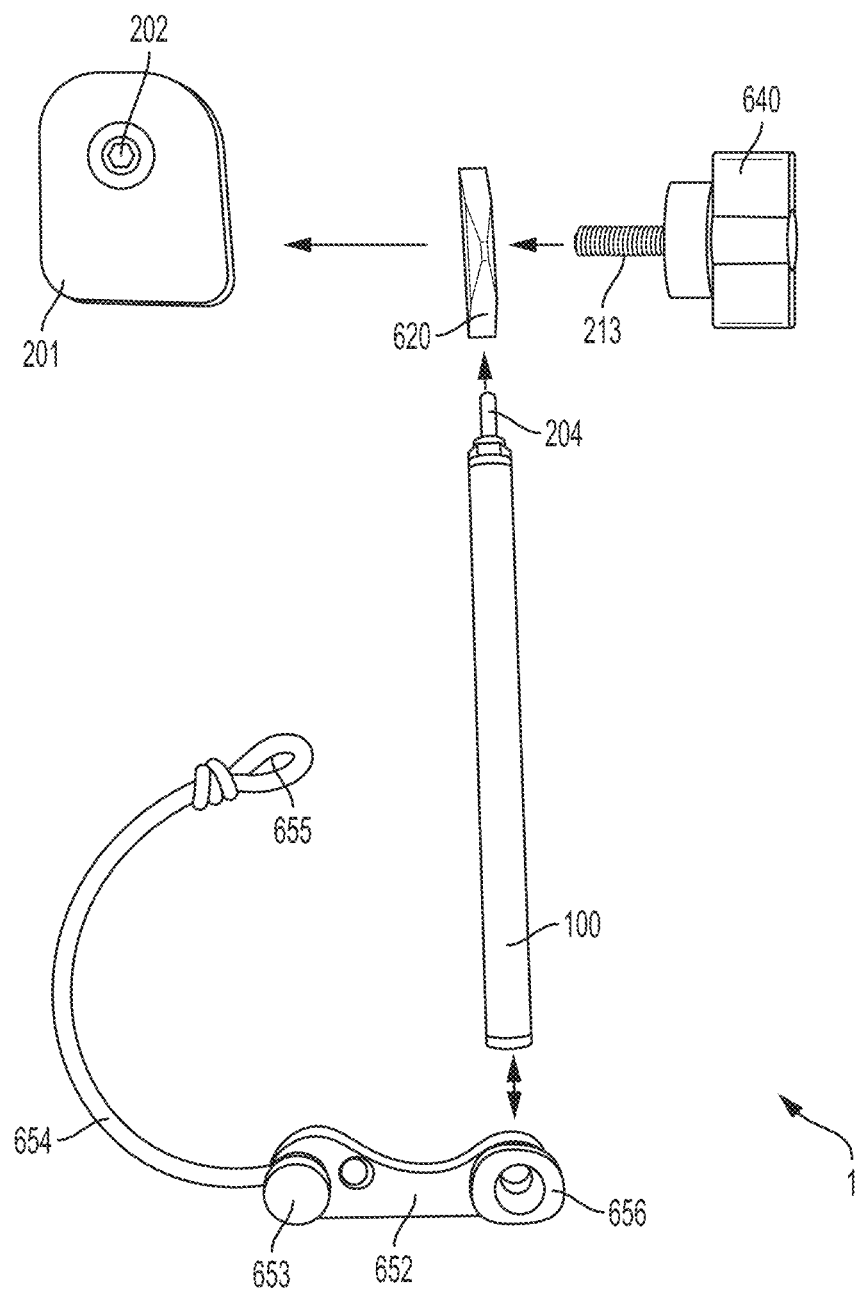
FIG. 6 is a segmented view of another embodiment of a stabilizing bow stand of the disclosed technology, suitable for affixation to a stabilizer.
Figure 7:
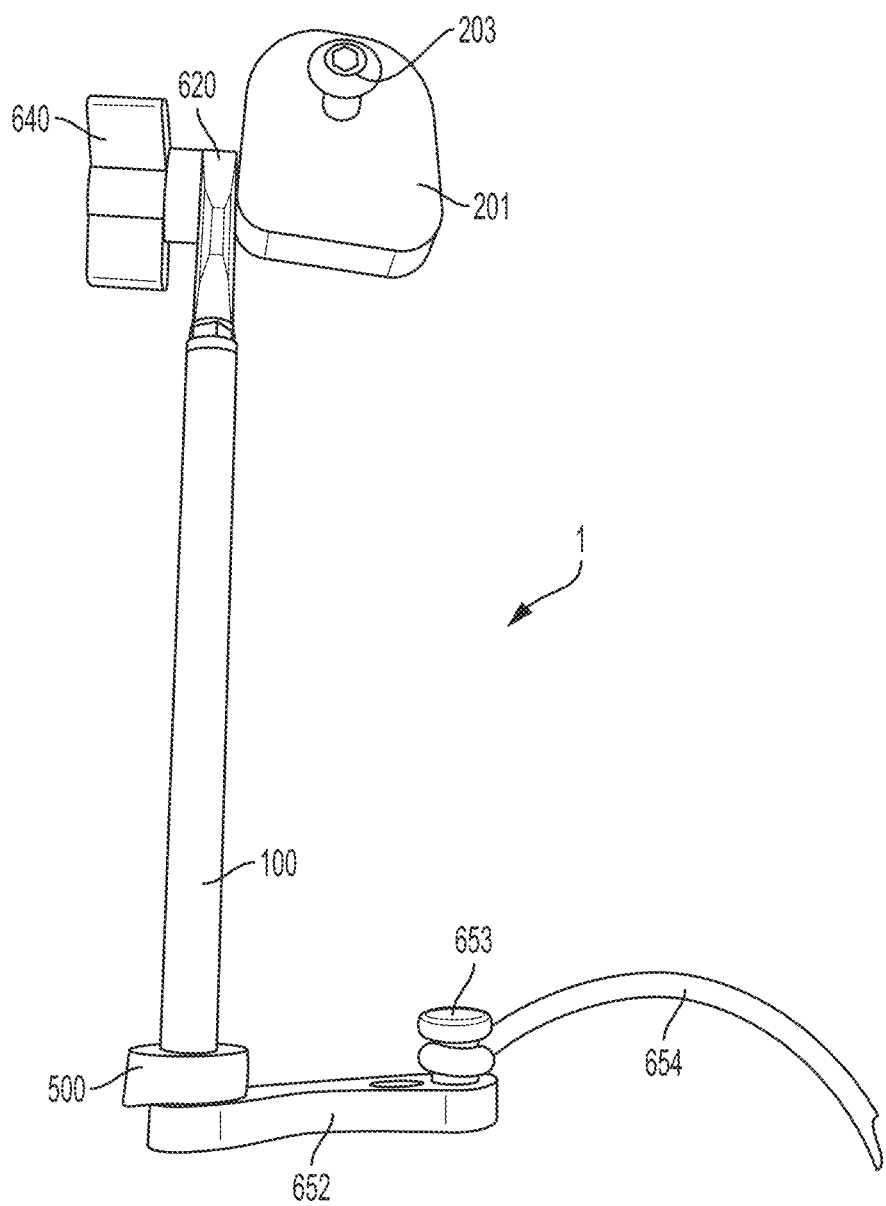
FIG. 7 is an assembled view of the embodiment of the stabilizing bow stand of FIG. 6.

As shown in the figures, the mounting bracket 200 of the disclosed technology has a support element 201 with a central mounting hole 202 sized and configured to receive fastening means 203, such as a bolt and a lock washer, facilitating the mounting of the bracket on a bow riser or at the end of a front stabilizer. As shown in FIG. 2, the support element may further comprise one or more cavities 299 about the central mounting hole, providing a flat surface to support the fastening means in close engagement with the riser of the bow. Many bows are designed with an aperture in the lower portion of the bow riser for supporting a front stabilizer; this aperture is suitable for use in supporting the mounting bracket of the disclosed technology on the bow riser (as shown in FIGS. 1 and 5). Further, many truncated front stabilizers (e.g., up to 12") have an aperture at the distal end thereof, also suitable for supporting the mounting bracket of the disclosed technology (see FIG. 5). When used with a stabilizer, the support element may be a disk, with cylindrical ends extending from the sides thereof.

Alternatively, but not shown, the mounting bracket may be configured as a riser or side mount bracket suitable for affixation to the bow riser by other fastening means, for use on bows that do not have a threaded aperture in the riser.

Figure 3:
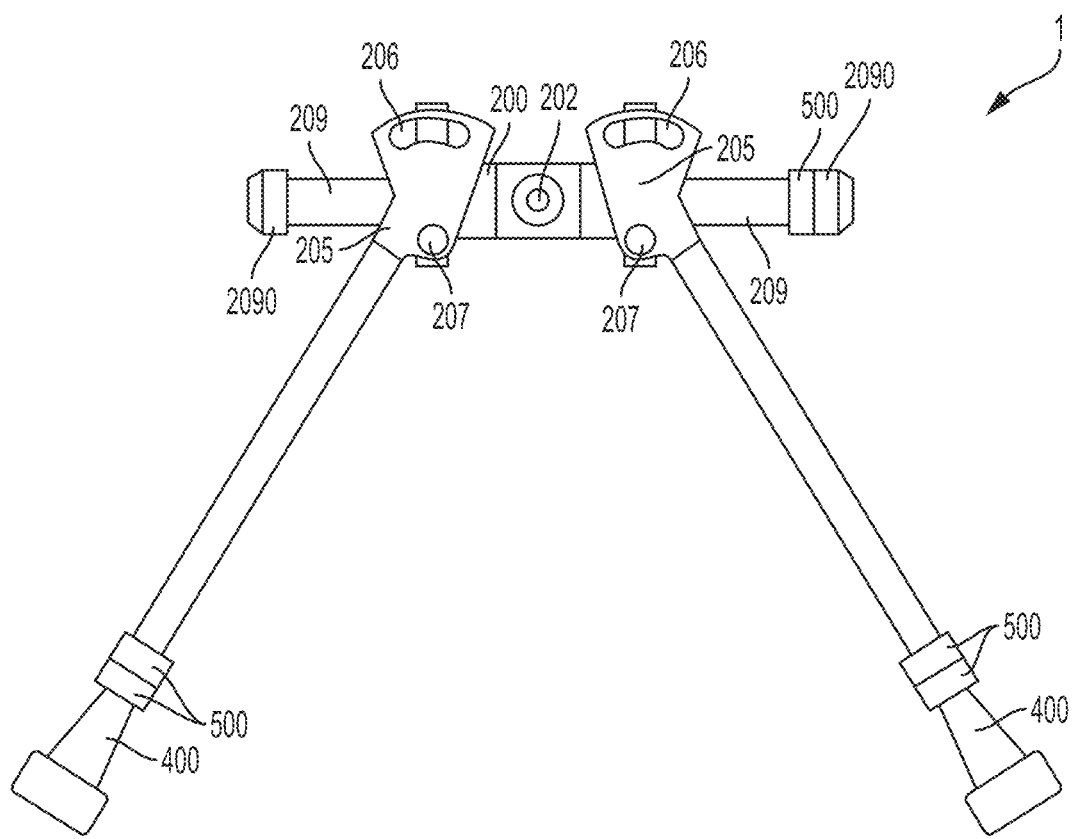
FIG. 3 is a perspective view of another embodiment of a stabilizing bow stand of the disclosed technology.
Figure 4:
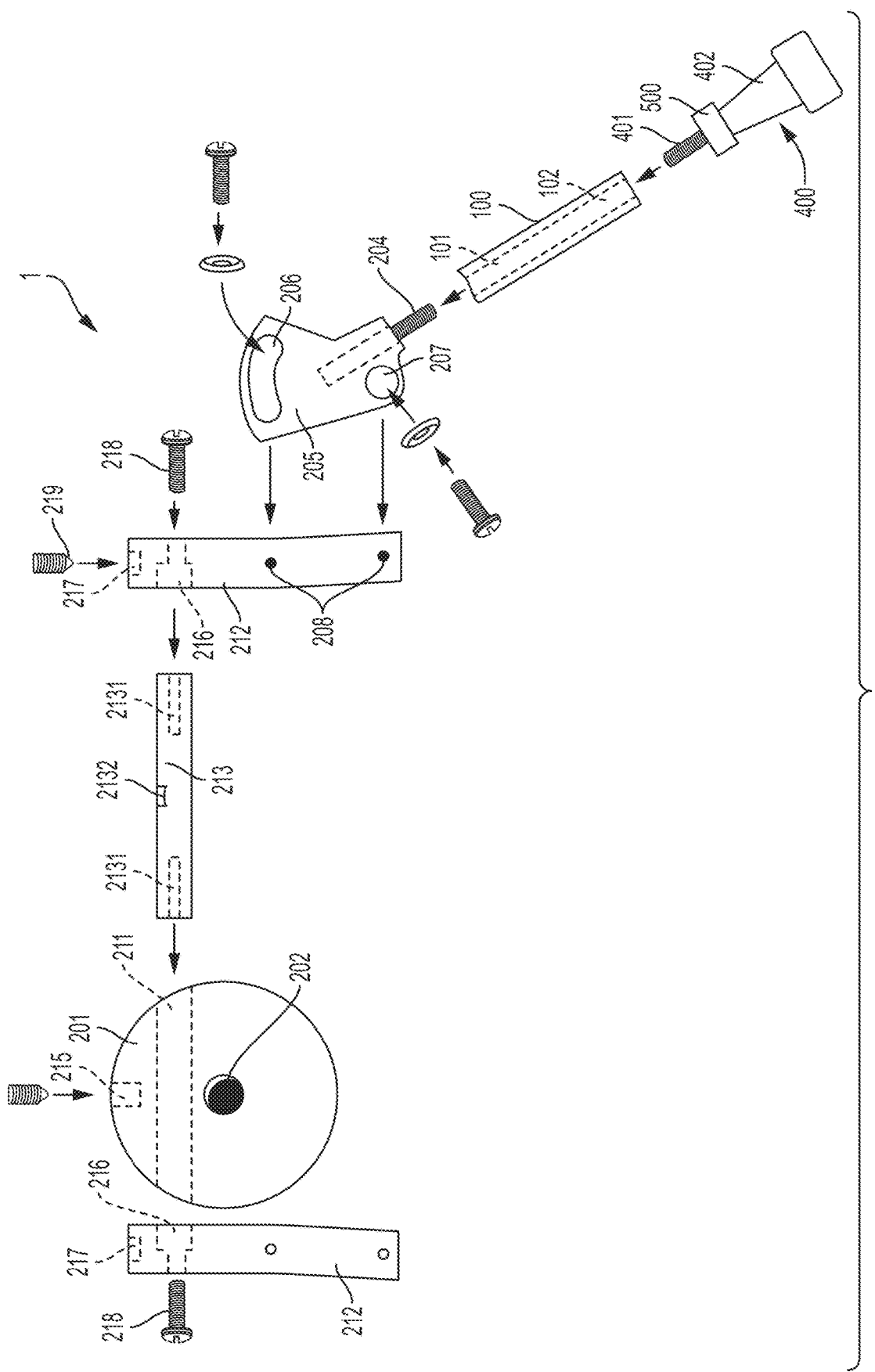
FIG. 4 is a segmented view of another embodiment of a stabilizing bow stand of the disclosed technology.

In some embodiments of the disclosed technology, as shown in FIGS. 1-4, the bow stand includes one or more positioning brackets 205, each positioning bracket being removably affixed to a side of the support element, and having a threaded shaft 204 for engagement with a threaded channel at the proximal end of a leg; in the embodiment shown, the threaded shaft extends at an angle from the longitudinal axis of the bracket. In these embodiments, each positioning bracket has one or more apertures, which when aligned with corresponding apertures on each end of the mounting bracket, may be removably affixed thereto by fastening means (e.g., a bolt and brass washer). In another embodiment, the shaft and channel may be reversed, so that the channel is on the positioning bracket, and the shaft is on the leg. A free shaft, having threads on both ends, may also be used to secure within channels of the mounting bracket and the legs. As shown in FIGS. 2-4, the positioning bracket may have an elongated upper arced slot 206 and a lower aperture 207, each sized and configured to receive fastening means and, when aligned with corresponding apertures 208 on the mounting bracket, to affix the positioning bracket to the mounting bracket, facilitating rotational adjustment of the orientation of the threaded shaft (or channel), and thereby the position of the leg, relative to the mounting bracket.

In an embodiment of the mounting bracket, as shown in FIGS. 2 and 3, the mounting bracket may further include one or more ring segments, suitable for sliding engagement with cylindrical ends of the support element, wherein the apertures 208 are threaded into each of the ends of the ring segment to receive the fastening means, and secure the positioning bracket to the ring segment. In this embodiment, loosening the fastening means allows the ring segment to slide along the length of the cylindrical end of the support element, and rotate about its longitudinal axis, to facilitate multiple positions of the positioning bracket relative to the support element, while tightening the fastening means secures the ring segment (and the positioning bracket) in a desired position relative to the support element.

In the embodiment of FIG. 3, the support element may further include a pair of extension pins 209, each extension pin extending from an end of the support element, and terminating with a removable nut head or rubber stop 2090. In this embodiment, to further facilitate balance of the bow, one or more weights 500 may be received on a threaded shaft extending from the extension pin (or a threaded shaft extending from the rubber stop), the weights being supports on the mounting bracket when the shaft is threaded into a channel in the rubber stop (or in the extension pin). The extension pins may be made from carbon or aluminum.

In the embodiment of FIG. 4, the support element may be configured as a support element 201 having a latitudinal channel 211 extending through the support element, and positioned above the central mounting hole. The support element may be cylindrical in shape, as shown, or any other suitable shape. In this embodiment, the mounting bracket includes a pair of arms 212, each arm having an exterior side and an interior side, and being designed and configured to independently rotate on opposing sides of the support element. A pin 213 is received in the latitudinal channel of the support element and extends into corresponding latitudinal orifices 216 of each arm, from the interior side. Threaded orifices 2131 extend longitudinally into the ends of the pin, and a locking hole 2132 is centrally positioned on the surface of the pin.

In this embodiment, the support element may further include a longitudinal orifice 215, extending from its top surface into the latitudinal channel of the support element to receive a locking screw. When received in the longitudinal orifice, the locking screw protrudes into the latitudinal channel of the support element and engages with the locking hole of the pin, to limit rotational movement, and restrict horizontal movement, of the pin within the latitudinal channel of the support element.

Each of the arms of this embodiment includes a latitudinal orifice 216 near a first end of the arm, the latitudinal orifice being sized to receive an end of the pin from the interior side of the arm, and fastening means 218 (bolt or screw) from the exterior side of the arm. By this configuration, a threaded shaft of the fastening means may be received and secured within the threaded orifice in the corresponding end of the pin, thereby securing each arm to the mounting bracket. In an alternative embodiment (not shown), the pin may have threaded shafts extending from its opposing ends, in lieu of the threaded orifices, the threaded shafts designed and configured to extend through the latitudinal orifices of the arms when engaged with the pin and the support element, and receive securing means (such as nuts) on the exterior side of the arms, to secure the arms to the support element by means of the pin. In either configuration, the arms may be rotatably positioned relative to the support element/pin. To independently secure the arms in a fixed position relative to the pin, a longitudinal orifice 217 extends into the first end of each arm and into its latitudinal orifice, the longitudinal orifice being designed and configured to receive a set screw 219. When the set screw is fully secured within the longitudinal orifice and into the latitudinal orifice, engaging with the pin or fastening means within the latitudinal orifice, the orientation of each arm relative to the support element/pin is set.

In this embodiment, each of the arms further has a pair of corresponding apertures 208 on the lower portion of the arm, positioned to facilitate affixation of the positioning bracket 205 to the arm, by fastening means, as otherwise described hereinabove in other embodiments.

By this configuration, the mounting bracket facilitates multiple and independent positions of the each of the legs relative to the mounting bracket, in about at least two distinct axes of the mounting bracket, by selecting independent orientations of (i) each arm relative to the support element, and (ii) each positioning bracket relative to an arm.

The arms may further have a bend along their length (see, e.g., FIG. 4), to position the legs at opposing angles to perpendicular when engaged with the arms.

Figure 9:
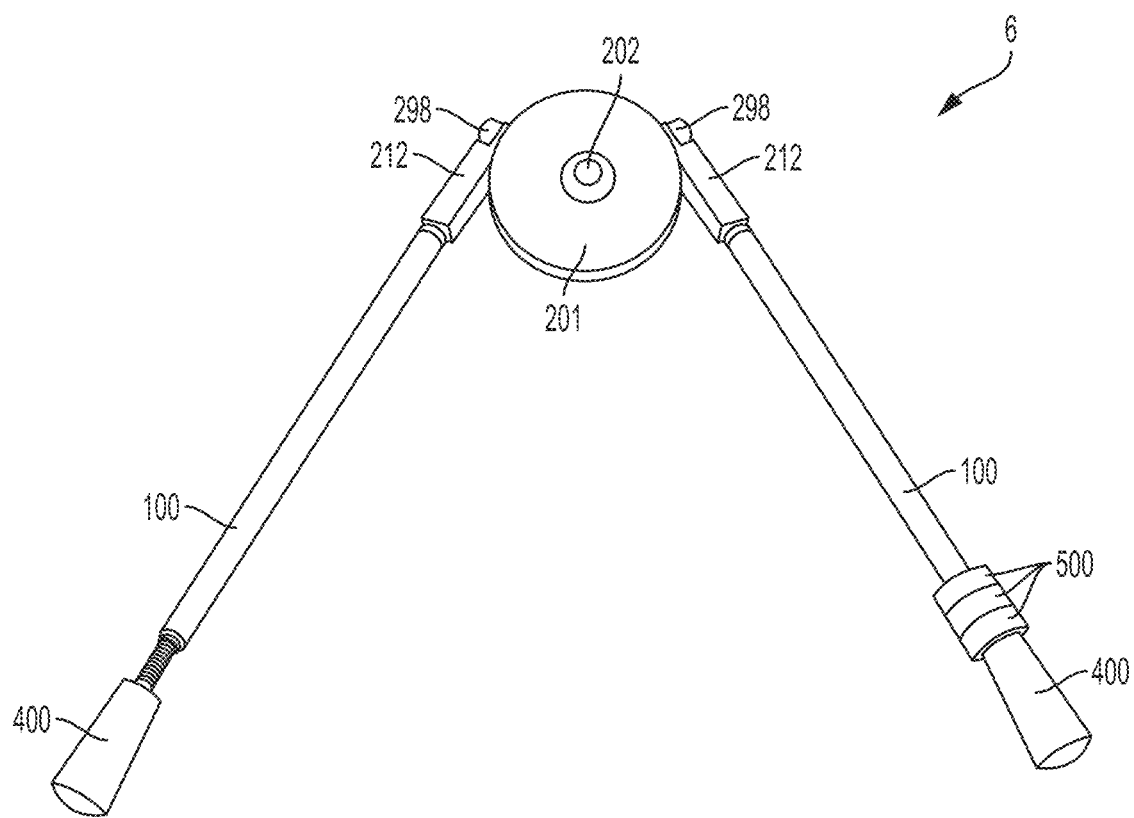
FIG. 9 is a perspective view of another embodiment of a stabilizing bow stand of the disclosed technology.

In a similar embodiment, as shown in FIG. 9, the arms 212 are independently, rotationally secured about the support element 201 by means of independent pins 298, wherein the point of affixation of the arms to the support element causes the legs engaged with the arms to extend at an angle out from the longitudinal axis of the support element.

In another embodiment, as shown in FIGS. 5-8 and 10-12, the mounting bracket includes a latitudinal channel 211 extending centrally and laterally through the support element for receiving a pin 213. A knob 640 may be affixed to an end of the pin to facilitate tightening and loosening of the pin. The mounting hole 202 of the support element is centrally positioned within the upper portion of the support element, traversing the depth of the support element, and sized and configured to receive and support fastening means, such as a bolt and a lock washer, facilitating the mounting of the bracket to the riser or the end of a stabilizer (notably, a single legged embodiment is intended for use at the front of the stabilizer, while embodiments having two legs are intended for use on either the riser or the front of the stabilizer).

In this embodiment the mounting bracket further includes a frame 620, sized and configured to be rotationally affixed to the support element by means of the pin 213. The stand, when mounted to the end of a stabilizer, rotates between an extended position for supporting the bow in a standing position (see, e.g., FIG. 5), and a storage position folded back parallel with the stabilizer (see, e.g., FIG. 8), when the bow is in use or for transport/storage.

In the embodiment shown in FIGS. 6, 7, and 10-12, the frame has a first vertical segment 625. The first vertical segment of the frame includes a lateral channel for receiving and supporting the pin, aligned with the latitudinal channel 211 of the support element, wherein the pin traverses the channels of the frame and the support element, when aligned in assembly as a mounting bracket. In this embodiment, the pin may be secured on the side of the support element opposing the first vertical segment, by means of a nut or similar securing means. In the embodiment shown in FIG. 11, the frame has a second vertical segment 622 for supporting a second leg, the segment including a lateral channel for receiving and supporting the pin, aligned with the latitudinal channel of the support element, wherein the pin traverses the aligned channels of the support element and the frame segments. In this embodiment the pin may be secured on the exterior face of the second vertical segment by means of a nut or similar securing means.

In this embodiment the frame further includes one or more threaded longitudinal apertures 623 in the bottom of the vertical segment(s), to receive a threaded shaft 651 of a leg. In an alternative embodiment, not shown, a leg is affixed to the frame by means of an aperture within the proximal end of the leg, sized and configured to receive a threaded shaft extending from the bottom of the vertical segment of the frame.

Figure 10:
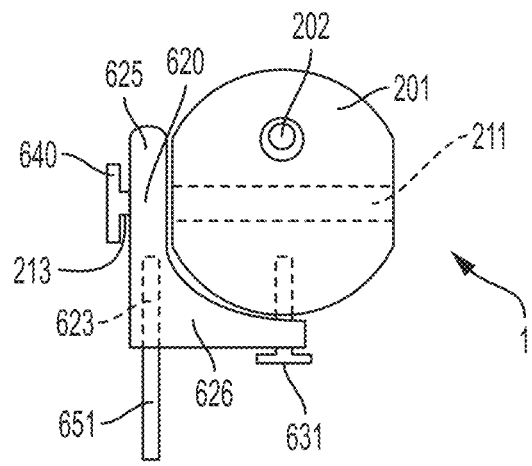
FIG. 10 is a front view of an embodiment of a mounting bracket of the disclosed technology.
Figure 11:
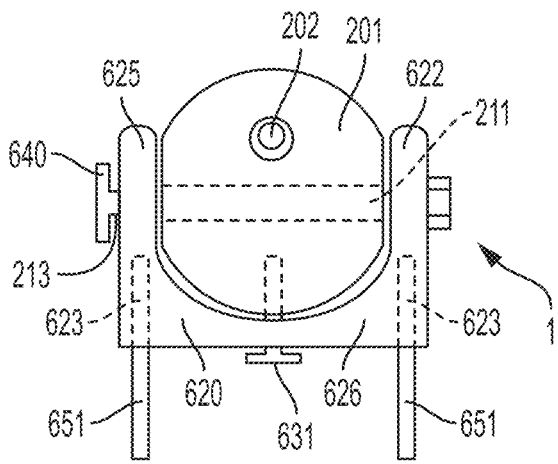
FIG. 11 is a front view of an embodiment of a mounting bracket of the disclosed technology.

In the embodiments of FIGS. 10-11, the frame further has a horizontal segment 626. As shown in FIG. 10, the horizontal segment may extend from the lower portion of the first vertical segment, and past the center of the support element when the frame is positioned on the support element. In the embodiment shown in FIG. 11, the frame includes a second vertical segment, and the horizontal segment extends between lower portions of the first and second vertical segments. The horizontal segment of these embodiments has an aperture, aligned with an aperture centrally positioned through the bottom of the support element, through which apertures fastening means 631 may be received to lock the position of the frame relative to the support element.

Figure 12:
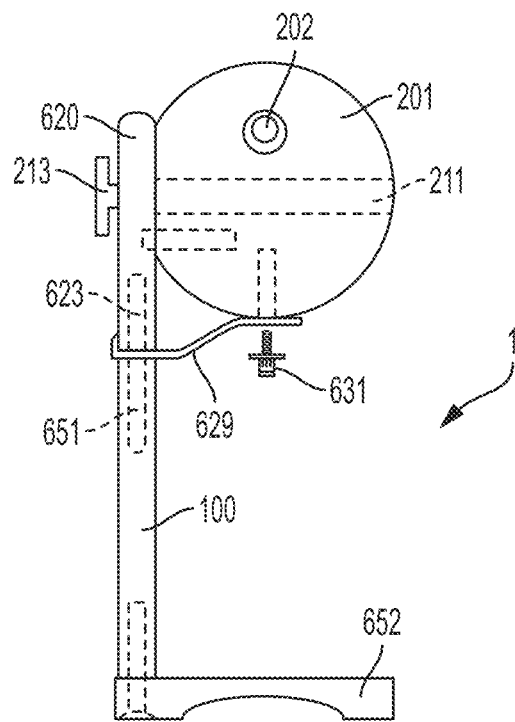
FIG. 12 is a front view of another embodiment of a stabilizing bow stand of the disclosed technology.

In the embodiment of FIG. 12, in lieu of the horizontal segment the frame has a clip 629, secured to the lower end of the vertical segment of the frame. This clip is sized and configured so that when the frame is rotationally affixed to the support element, the terminus end of the clip rests along the bottom surface of the support element. In the embodiment shown, the terminus end of the clip has an aperture to receive fastening means 631 to secure the clip (and the frame) to an aperture of the support element (thereby securing the rotational position of the frame relative to the support element, in an extended position).

As shown in FIGS. 1-5, the leg 100 of the disclosed technology has a proximal and a distal end. The leg may be made from carbon or aluminum, or another suitable, lightweight material. It is contemplated that the shaft of an arrow may be used as a leg in the disclosed technology. The leg has a threaded channel 101, 102 at each of the proximal and distal ends of the leg. The threaded channel 101 of the proximal end of the leg is designed and configured to receive the threaded shaft of a positioning bracket or mounting bracket. In an alternative embodiment, the leg comprises a threaded shaft secured at its proximal end, designed and configured to be received in a threaded channel of a positioning bracket or mounting bracket.

Removably secured at the distal end of the leg is a foot system 400. The foot has a threaded shaft 401 designed and configured to be received in the threaded channel of the distal end of a leg, the shaft being affixed to and extending from the longitudinal axis of a base structure 402. This threaded shaft may alternatively be an independent element, having threads on each end (or traversing its length), to engage with a corresponding threaded channel in each leg and base of a foot. In some embodiments the base structure is in the shape of a truncated cone, made from rubber. In an alternative embodiment, a shaft is affixed at the distal end of the leg, and the base structure includes a corresponding channel to receive in threaded engagement the shaft.

By this configuration, when the shaft of the foot is partially received within the channel of the distal end of a leg (or in the alternative embodiment, the shaft at the distal end of the leg is partially received within the channel of the base structure), the base structure may be maintained a distance away from the distal end of the leg by means of one or more weights 500, and/or a tool-less locking screw nut 403, each having an aperture sized and configured to receive the shaft of the foot/leg. Cylindrical weights 500 suitable for use with the disclosed technology have a central aperture to receive the shaft of the foot (or the distal end of the leg), as well as the extension pins 209 (if any) of the support element as hereinabove described.

Figure 8:
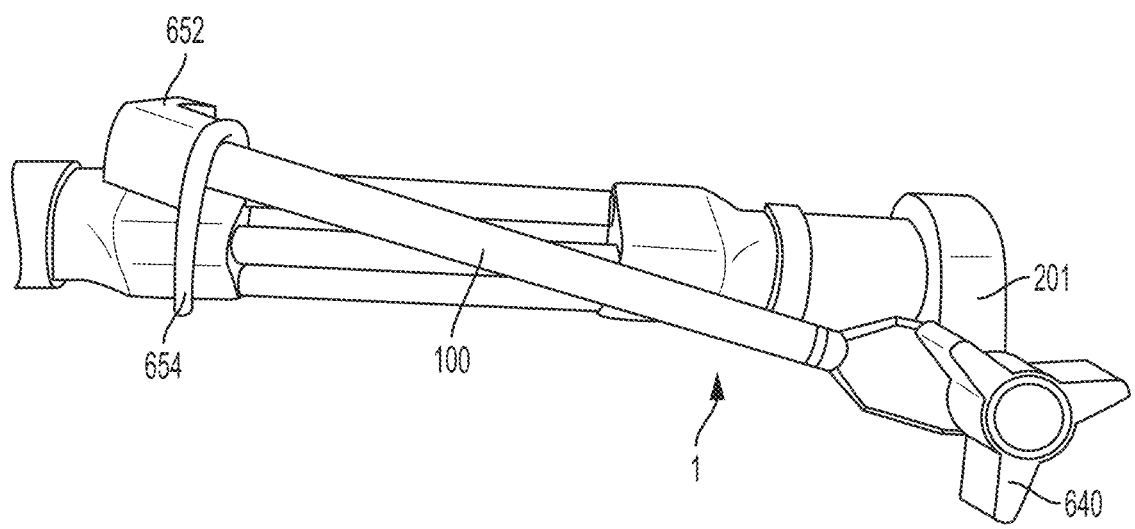
FIG. 8 is a perspective view of the embodiment of the stabilizing bow stand of FIG. 6, shown in the retracted position for use and storage of the bow.

Another foot 652 suitable for use with certain embodiments of the stabilizing bow stand (particularly single-legged embodiments, as depicted in FIGS. 5-8 and 12), the foot has a plug 653 at its terminus end, and further includes a rubber cord 654, extending from a distal end of the foot, with a loop 655 at the end of the cord. This cord can be wound around the stabilizer and the leg 100 when the front stabilizing stand is in its retracted position, as shown in FIG. 8, with the loop sized and configured to receive the plug and thereby secure the leg to the stabilizer, when the stand is not in use. The foot may be secured to the terminal end of the leg by fastening means 656, such as the embodiment of FIG. 6 wherein the fastening means is a rubber ring sized to be received and secured within an open aperture at the terminal end of the leg. Alternatively, the foot may include a threaded shaft sized and configured to be received within a threaded aperture in the distal end of the leg, which shaft can support one or more weights in a manner similar to the legs hereinabove described for the stabilizing bow stand. This foot may be made from rubber, or anther suitable, preferably flexible, material.

When used as a stabilizing bow stand on the front of the bow, extending from the stabilizer, the stand may be rotatable between an extended stand position (shown in FIG. 5), and a secured position (shown in FIG. 8) when the bow is in use or for storage. In other embodiments (for example, as shown in FIGS. 1-4 and 9), the stand may remain in the extended stand position when the bow is in use, providing stability to the bow. In these configurations, the stabilizing bow stand may have one or two legs, as shown in the embodiments of the Figures.

Fully assembled, as shown in the examples of FIGS. 1 and 5, the legs are affixed to the mounting bracket as hereinabove described, with the mounting bracket secured to the riser of the bow. The position of the legs are adjusted to balance the bow, and if desired one or more weights are added to at least one of the legs to further balance the bow for use. If weights are added to only one leg, the other leg may be lengthened by extending the foot away from the distal end of the leg, so that it has equal length with the weighted leg. This position may be secured by a lock nut, the aperture of the lock nut receiving the threaded post of the foot (or leg, depending on embodiment), with the lock nut engaged with the distal end of the leg. As shown in FIG. 5, a second stabilizing bow stand may be secured to a stabilizer extending from the front of the bow riser, such as at its end. Weights may likewise be positioned on one or more legs of this stand, and the legs may be adjusted to equal lengths by means of securing a lock nut with the distal end of either or both legs.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A stabilizing bow stand for use with a bow having a bow riser, the stabilizing bow stand comprising:
   a. a mounting bracket comprising a support element having a central mounting hole to facilitate mounting of the mounting bracket to the bow riser, the mounting bracket comprising a pair of opposite sides;

b. a pair of positioning brackets, each of the positioning brackets being affixed to a respective one of the opposite sides of the mounting bracket, wherein each of the positioning brackets comprises a plurality of apertures to receive fastening means to fasten the respective positioning bracket to the mounting bracket, one of the apertures of each of the positioning brackets being configured as an elongated arced slot to facilitate adjustment of a position of the respective positioning bracket relative to the mounting bracket, and wherein each of the positioning brackets comprises a shaft extending at an angle from a longitudinal axis of the respective positioning bracket;

c. a pair of legs, wherein each of the legs comprises a first threaded channel positioned at a proximal end of the respective leg and a second threaded channel positioned at a distal end of the respective leg, the first threaded channel of each of the legs being sized and configured to receive the shaft of a respective one of the positioning brackets; and d. a pair of feet, each of the feet comprising a base and a shaft affixed to and extending from the base, each of the shafts of the feet being designed and configured to be received in the second threaded channel of a respective one of the legs, wherein when the shaft of one of the feet is partially received within the second threaded channel of the respective one of the legs, the base of the one of the feet is a distance away from the distal end of the respective one of the legs, and wherein at least one of the shafts of the feet is designed and configured to receive and support one or more weights between the distal end of the respective one of the legs and the base of the respective one of the feet.

2. The stabilizing bow stand of claim 1, further comprising a locking screw nut positioned on the shaft of the one of the feet, the locking screw nut affixing the base of the one of the feet the distance away from the distal end of the respective one of the legs when the shaft of the one of the feet is received in the second threaded channel of the respective one of the legs.

\* \* \* \* \*